United States Patent
Antonuk

[19]

[11] Patent Number: 6,013,916
[45] Date of Patent: Jan. 11, 2000

[54] FLAT PANEL DOSIMETER

[75] Inventor: Larry E. Antonuk, Ann Arbor, Mich.

[73] Assignee: The Regents of the University of Michigan, Ann Arbor, Mich.

[21] Appl. No.: 08/900,367

[22] Filed: Jul. 23, 1997

[51] Int. Cl.$^7$ .................................................. G01T 1/02
[52] U.S. Cl. ................................ 250/370.07; 250/370.01; 250/370.06
[58] Field of Search .................... 250/370.07, 370.06, 250/370.01

[56] References Cited

U.S. PATENT DOCUMENTS

| | | |
|---|---|---|
| 4,381,450 | 4/1983 | Cappelli . |
| 4,758,186 | 7/1988 | Barriuso et al. . |
| 4,926,052 | 5/1990 | Hatayama et al. ................. 250/370.14 |
| 5,017,989 | 5/1991 | Street et al. . |
| 5,055,691 | 10/1991 | Burgess . |
| 5,079,426 | 1/1992 | Antonuk et al. . |
| 5,164,809 | 11/1992 | Street et al. . |
| 5,262,649 | 11/1993 | Antonuk et al. . |
| 5,379,336 | 1/1995 | Kramer et al. . |
| 5,381,014 | 1/1995 | Jeromin et al. . |
| 5,420,452 | 5/1995 | Tran et al. . |
| 5,498,880 | 3/1996 | Lee et al. . |
| 5,512,756 | 4/1996 | Bayer et al. . |
| 5,517,031 | 5/1996 | Wei et al. . |
| 5,525,527 | 6/1996 | Tran . |
| 5,528,043 | 6/1996 | Spivey et al. . |
| 5,665,970 | 9/1997 | Kronenberg et al. .................... 250/374 |

FOREIGN PATENT DOCUMENTS

| | | |
|---|---|---|
| 0239808 A1 | 10/1987 | European Pat. Off. . |
| 0574698 | 12/1993 | European Pat. Off. . |
| 1-227983 | 9/1989 | Japan ................................ 250/370.07 |
| WO 91/03745 A1 | 3/1991 | WIPO . |

OTHER PUBLICATIONS

Lee, H, et al., "Hydrogenated Amorphous Silicon (A–Si:H) Based Gamma Camera—Monte Carlo Simulations", Lawrence Berkeley Laboratory—University of California, Jan. 1994, 1–12.

*Primary Examiner*—Constantine Hannaher
*Attorney, Agent, or Firm*—Oblon, Spivak, McClelland, Maier & Neustadt, P.C.

[57] ABSTRACT

A dosimetry device which includes a conversion element for converting incident radiation to high energy electrons. A sensor is disposed in a path of the incident radiation to receive high energy electrons from the conversion device, to thereby generate in the sensor electrons and/or holes due primarily to the high energy electrons received from the conversion device. These electrons and/or holes generated in the sensor are then read as an indication of energy of the incident radiation. The sensor thereby receives the high energy electrons from the conversion device without conversion of the incident radiation to light energy.

42 Claims, 9 Drawing Sheets

FLAT PANEL DOSIMETER

The present application is based on research funded from government contract NIH R01-CA51397; the U.S. government may have certain rights under this application.

BACKGROUND OF THE INVENTION

1. Field of the Invention

The present invention pertains generally to the field of radiation detecting devices and, more particularly, to the field of radiation dosimetry devices, such as disclosed in U.S. Pat. Nos. 5,079,426 and 5,262,649, the disclosures of which are incorporated by reference herein.

2. Discussion of the Background

There are several instances in which dosimetry of ionizing radiation, such as diagnostic x-rays, megavoltage x-rays, electrons, protons, neutrons, heavy ions, pions, etc., is needed. Dosimetry includes the measurement and/or calculation of absorbed dose, also known as dose, where dose is defined as the energy absorbed per unit mass of the irradiated target material (for example a patient). In one common instance in modem radiotherapy, x-rays or some other type of radiation are generated and are directed onto a patient.

In external beam megavoltage radiation therapy, it is highly desirable that a maximum dose be delivered to a target volume containing a tumor and a minimum dose be delivered to the normal tissue surrounding the target volume. In this application, it is important to fully characterize the source of the radiation beam so as to be able to predict the amount of dose absorbed in the patient including both normal and cancerous tissue. For example, it is highly useful to be able to determine the dose as a function of depth into the patient. This depends upon, among other things, the energy of the radiation beam, the size of the radiation field, the distance to the surface of the patient from the radiation source, and the density of various anatomical structures. Similar issues of characterization and prediction apply in the case of non-medical applications where a knowledge of dose in an object made of a material other than human tissue is desired.

Characterization of the source of the radiation beam in medical applications is typically accomplished by performing measurements of dose in a material, such as water, whose radiological properties are equivalent to human tissue. In the case of non-medical applications a number of options are available for characterization of the source of the radiation beam. For example, measurements in water (or some water equivalent material) can also be performed which, when combined with calculational correction, give predictions for the value of dose in the object of interest. Another method involves performing measurements of dose in a material whose radiological properties are equivalent to those of the object in which the dose is to be determined.

Two commonly utilized systems for performing dosimetric measurements are described below.

A first system utilizes a water tank, for example of 40 cm×40 cm×40 cm, and an x-ray sensor within the water tank. In such a system utilizing a water tank, x-rays are emitted from a radiation source at a predetermined energy. The x-ray sensor within the water tank is then moved to various positions to take measurements of the received x-ray radiation. This information is then stored. Then, an x-ray radiation of different parameters is output from the imaging device, and the sensor is again moved to various positions within the water tank to detect the incident x-ray radiation. The parameters which are varied from the radiation source may include energy, size of field, distance from radiation source to sensor, etc. This operation is then continued until the desired characteristics of the x-ray radiation output from the radiation source are determined.

A second known dosimetry system involves positioning x-ray film between layers of some solid material whose radiological properties closely approximate those of human tissue. We define the term human tissue substitute to describe such solid material. Examples of human tissue substitute include acrylic, plexiglass, or solid water (the latter made by Gammex, RMI) which are used as general substitutes for liquid water of which human tissue largely consists. Similarly, other materials are used as human tissue substitutes for lung, bone, etc. With this system, x-ray radiation is output from a radiation source while the x-ray film is positioned at a particular distance away from the radiation source, i.e., in a particular plane away from the x-ray source. Then, for a given set of parameters, e.g., energy, field size, distance from radiation source, etc., the x-ray film is exposed to the x-ray radiation and the x-ray film is then developed. This operation is then repeated for x-ray radiation of different parameters based on varying the parameters noted above, e.g., energy, field size, distance from radiation source to x-ray film, etc. All of the information from each of the x-ray films are then scanned and stored in a memory, and are then processed appropriately to determine the characteristics of the x-ray source.

This dosimetry process of determining the characteristics of the x-ray radiation on x-ray exposure film is very slow since the x-ray film must be variously exposed, and then information from the x-ray films must be scanned, digitized and processed.

U.S. Pat. Nos. 5,079,426 and 5,262,649 disclose radiation imaging systems which can be utilized for dosimetry. The systems disclosed in these patents require that an input x-ray radiation is converted into light energy by a phosphor scintillating layer 44 and a phosphor photo-to-electron conversion layer 46. The drawbacks with the dosimetry sensors disclosed in these devices is that the dosimetry sensors themselves which include the phosphor scintillating layer 44 and the photon-to-electron conversion layer 46 utilize high atomic number elements.

SUMMARY OF THE INVENTION

An object of the present invention is to provide a novel dosimetry device for a radiation generating device which is quick and accurate.

The present invention achieves these objects by providing a high energy dosimeter which includes a medium in which dose is to be determined and in which incident radiation, for example X-ray radiation is absorbed to result in emission of high energy electrons. A sensor is provided adjacent to the medium to receive the high energy electrons from the medium. As a result, electrons and holes generated in the sensor are due primarily to the high energy electrons received from the medium. These electrons and holes are generated in the sensor and are extracted as an indication of energy of the incident radiation.

In one embodiment of the present invention, the medium includes at least one layer of a human tissue substitute.

With the structure of the present invention, the high energy radiation dosimetry device does not require the use of any scintillating or photon-to-electron conversion layers to convert the incident radiation to light energy. This provides the benefits of allowing a sensor with an overall structure which is very similar to water, and which as a result is as close to human tissue as possible, thus to provide a highly accurate dosimetry operation.

The present invention can also perform dosimetry in real-time.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The dosimetry system of the present invention can be used to make dosimetric measurements for a variety of situations including those involving megavoltage and diagnostic beams as well as other radiation beams. In the case of megavoltage beams, such applications may include measuring absolute dose, relative dose distributions (for example beam profiles with and without wedges, depth doses) in phantoms (for example water or solid water), quality assurance of machine output, beam flatness and symmetry, measurement of temporally varying beams (for example scanning beams are dynamic wedges) and transmission for exit dosimetry for patients.

The dosimetry system of the present invention may find application in both medical and non-medical applications.

According to the present invention, it is recognized that certain dosimetry applications can be enhanced if a sensor device as a whole simulates water, which has a low atomic number. This results because water provides a good approximation for human tissue onto which the x-ray radiation is to impinge. Certain other dosimetry applications may require approximations of bone, lungs, etc., or non-human tissue related materials.

Referring now to the drawings, wherein like reference numerals designate identical or corresponding parts throughout the several views and, more particularly, to FIG. 1(a) thereof, a first embodiment of the present invention will now be discussed.

Figure 1A:
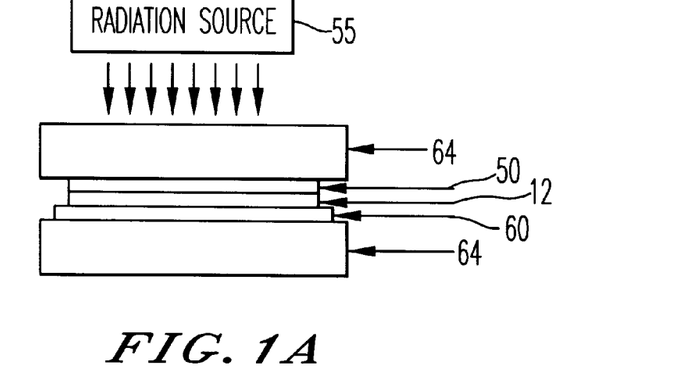
FIG. 1(a) shows a dosimetry device of the present invention.

A preferred embodiment of the present invention is shown in FIG. 1(a). As shown in FIG. 1(a), the device of the present invention includes a sensor 50 mounted on a substrate 12. A radiation source 55 may be provided to generate incident radiation to the sensor 50. The substrate 12 is in turn optionally mounted on a mechanical backing 60. Mechanical backing 60 can be omitted if the substrate 50 provides sufficient support for the sensor 50. In a medical application this mechanical backing 60 may be formed of a human tissue substitute layer. In non-medical dosimetry applications, the mechanical backing 60 can be replaced with another material whose radiological properties are equivalent to those of the object in which the dose is to be determined. The substrate 12 could also be deleted and the sensor 50 may then be mounted directly on the mechanical backing 60, e.g., a human tissue substitute layer. In another embodiment, the substrate 12 can be replaced with a human tissue substitute material in the case of medical applications, or in the case of non-medical applications with another material whose radiological properties are equivalent to those of the object in which the dose is to be determined. The mechanical backing 60 can also be prepared to remove all air bubbles between the substrate 12 and the mechanical backing 60 (or between the sensor 50 and the mechanical backing 60) so as to improve the quality and precision of the dosimetric measurements. In the embodiment shown in FIG. 1(a), the structure is sandwiched by two human tissue substitute layers 64.

The present invention as shown in FIG. 1(a) does not require incident x-ray radiation to be converted into light energy. That is, in the present invention, direct x-ray radiation impinges on the sensors 50 through the upper human tissue substitute 64, i.e., there is no requirement that the incident x-ray radiation be converted into light energy prior to being sensed by the sensor 50, although this direct x-ray radiation directly impinging on the sensor 50 has a minimal effect due to a thinness of the sensor 50, as discussed in further detail below. As a result, in the present invention the sensor device as a whole has low atomic number and the overall structure of the sensor 50 and human tissue substitute layers 64 provide a good correspondence to human tissue.

Figure 1B:
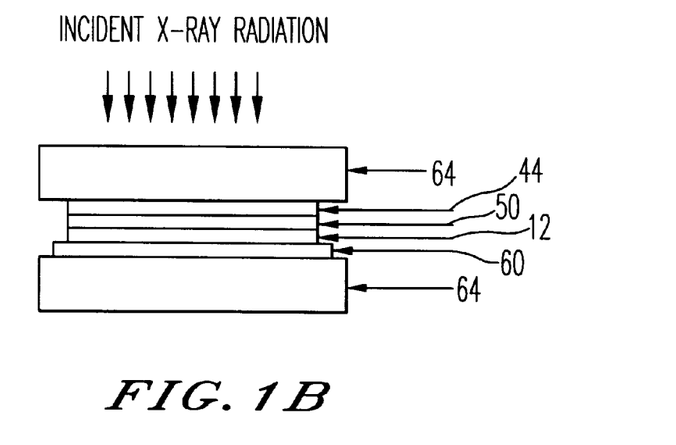
FIGS. 1(b)–1(c) show structures of different dosimetry devices to compare the present invention as shown in FIG. 1(a) with the devices shown in FIGS. 1(b) and 1(c)
Figure 1C:
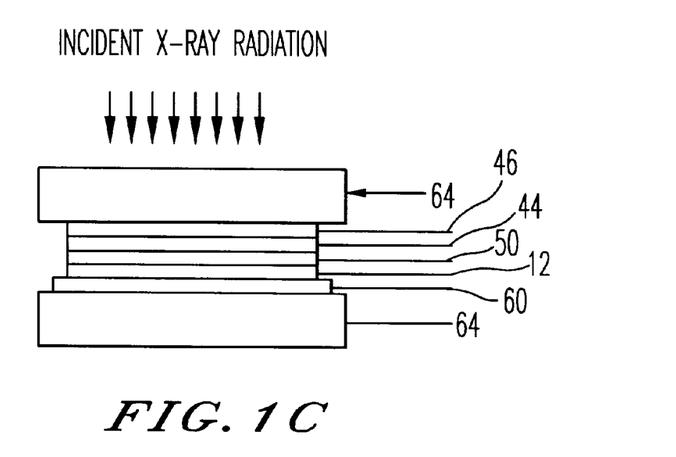

To compare the device of the present invention as shown in FIG. 1(a), dosimetry devices as shown in FIGS. 1(b) and 1(c) which utilize overall sensor devices as disclosed in U.S. Pat. Nos. 5,079,426 and 5,262,649 are shown. These devices disclosed in FIGS. 1(b) and 1(c) utilize the complete sensor systems of U.S. Pat. Nos. 5,079,426 and 5,262,649 formed between two human tissue substitute layers 64. The dosimetry devices disclosed in U.S. Pat. Nos. 5,079,426 and 5,262,649 sense x-ray radiation indirectly by converting the incident x-ray radiation into light energy, and thus require the use of phosphor scintillating layer 44 and copper photon-to-electric conversion layer 46. As a result, the dosimetry sensors in these devices cannot provide as good dosimetry results for human tissue as in the present invention as they do not approximate materials which are radiologically equivalent to human tissue as well as the sensor device of the present invention.

In evaluating the structures of the present invention as shown in FIGS. 1(a)–1(c) and as disclosed in U.S. Pat. Nos. 5,079,426 and 5,262,649 for dosimetry applications, the inventors performed certain comparative experiments between different devices.

As noted above, the structure of the present invention for performing dosimetry measurements of x-ray radiation from imaging devices mounts a sensor 50 between two human tissue substitute layers 64, and which allow measurements that normally have to be performed in water to be performed in a solid material.

First evaluated was a device of the present invention as shown in FIG. 1(a). This device included two stacks of solid water 64, for example of approximately 20 cm thickness, sandwiching the sensor 50 formed on a glass substrate 12 and a mechanical backing 60, which was a layer of solid water. A further device evaluated is shown in FIG. 1(b) and is similar to the device of FIG. 1(a) but further included a phosphor layer 44, also utilized in the devices shown in U.S. Pat. Nos. 5,079,426 and 5,262,649. A further device to be evaluated shown in FIG. 1(c) was similar to the device in FIG. 1(b) but included a further copper layer 46, again as utilized in the devices shown in U.S. Pat. Nos. 5,079,426 and 5,262,649. The sensor 50 in these devices evaluated corresponded to the sensor array disclosed in U.S. Pat. No. 5,262,649.

These different devices of FIGS. 1(a)–1(c) were evaluated by applying megavoltage radiations of 6 MV and 15 MV.

Figure 2:
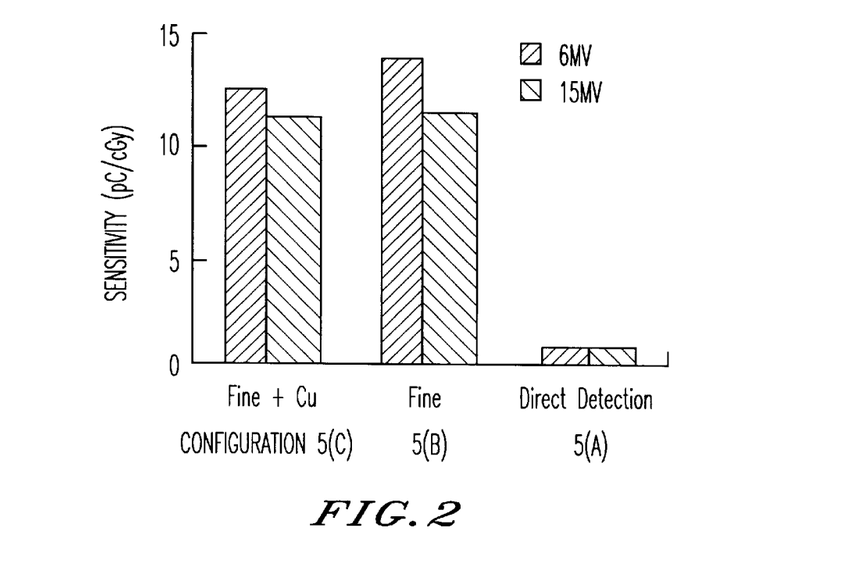
FIG. 2 shows test results of comparisons between the configurations of FIGS. 1(a)–1(c)

FIG. 2 shows results of a size of received pixel signals for the configurations of FIGS. 1(a), 1(b) and 1(c). For each of these configurations of FIGS. 1(a)–1(c), measurements were performed at 6 MV and 15 MV, and for the configuration of FIG. 1(a) with an overlying amount of solid water 64 of 1.4 and 30. cm, respectively, corresponding to a depth of a maximum dose. A field size was a 10×10 cm, and the sensor 50 was placed 100 cm from the x-ray radiation source. The results in FIG. 2 show that when no phosphor layer 44 or copper layer 46 is provided, as in the embodiment of FIG. 1(a), a signal of approximately 10% of a signal when a phosphor layer 44 was present was still detected.

This result is counterintuitive in that no signal would be expected from the device of FIG. 1(a) because the incident x-ray radiation was not converted into light energy in such a device as shown in FIG. 1(a). The origin of such a signal as detected in the configuration of FIG. 1(a) is the result of the passage of high energy electrons through the sensor 50, which thereby causes ionization, and thus the creation of charge which is, in turn, stored in a photodiode sensor capacitance and is then read out. Such a sensor 50 would typically have a thickness of approximately 1 $\mu$m, and thus very few x-ray photons would directly interact in the sensor 50 given its extreme thinness of approximately 1 $\mu$m, and the x-ray photons instead create high energy electrons (via photoelectric interactions, Compton scattering, pair production, etc.), in the overlying material of the solid water 64, the glass substrate 12, the mechanical backing 60 and the underlying material of solid water 64, which in turn create charge in the sensor 50.

Figure 3A:
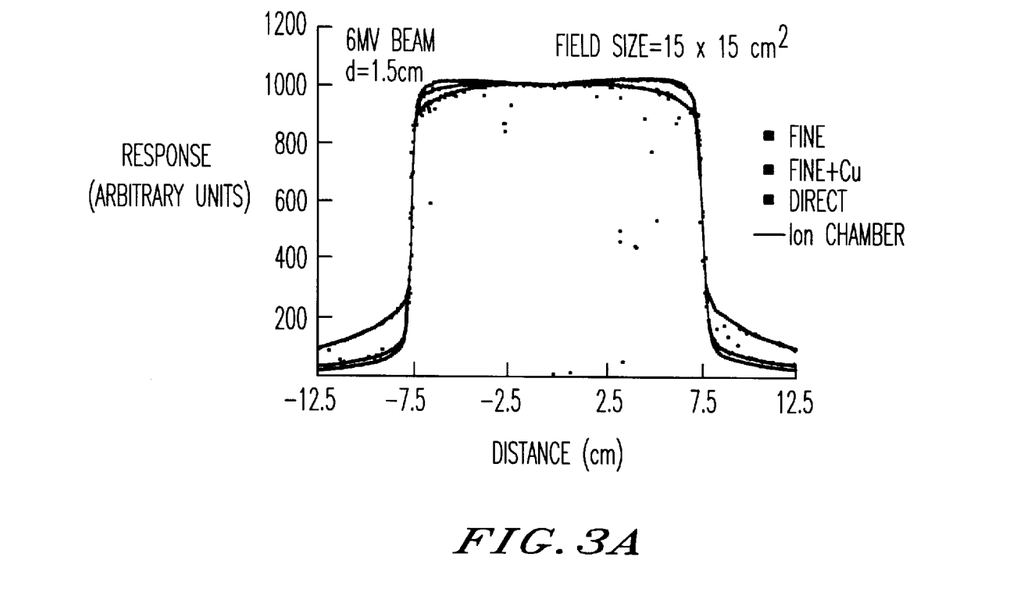
FIGS. 3(a) and 3(b) show test results of comparisons between the configurations of FIGS. 1(a)–1(c) and an ion chamber dosimetry device.
Figure 3B:
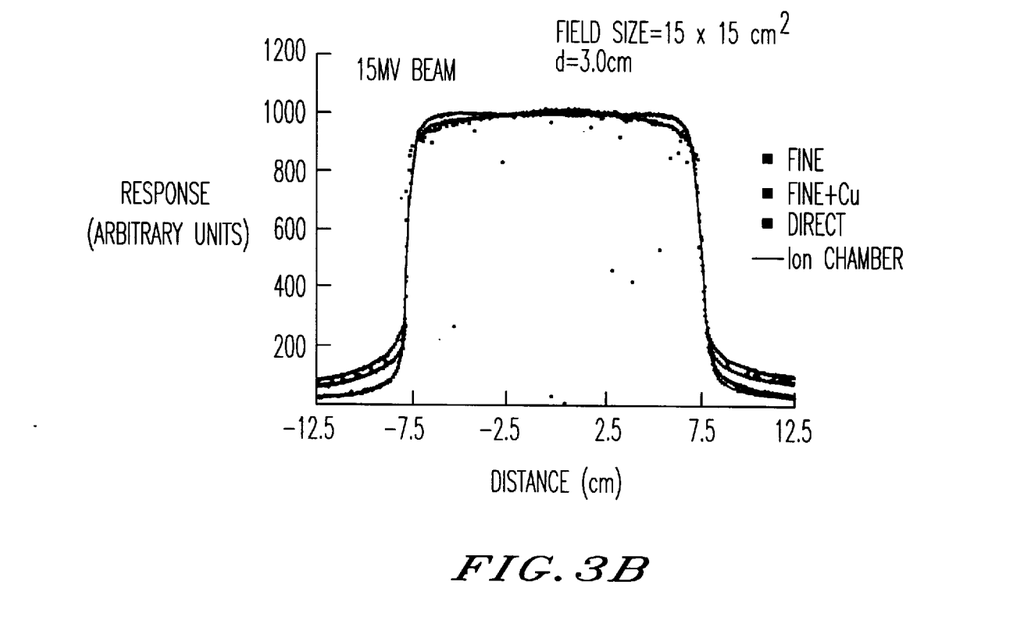

FIGS. 3(a) and 3(b) further show measurements of a pixel signal along a single data line when the sensor 50 was centered in a 15×15 cm 6 MV and 15 MV x-ray beam respectively. The beam profile data is shown for the configurations of FIGS. 1(a)–1(c). In FIG. 3 and the following figures some of the pixels were defective and hence their data points do not follow the general trend. Moreover, superimposed on this data are the results of a beam profile data acquired with the background above-discussed dosimetry system utilizing an ion chamber. The shown ion chamber data is taken to be a gold standard, i.e., ideal data which would be desirable if an array could reproduce such data. As is shown in FIGS. 3(a) and 3(b), the data from the configurations of FIGS. 1(a) and 1(c) reproduce the data of the ion chamber to a limited degree. However, the configuration of FIG. 1(a) reproduces the data of the ion chamber to a much higher degree of precision throughout.

The inventor performed further experiments to confirm that such a configuration as shown in FIG. 1(a) provides data closely resembling that achieved by a dosimetry system utilizing an ion chamber. The results of such further experiments are shown in the FIGS. 4(a)–9.

Figure 4A:
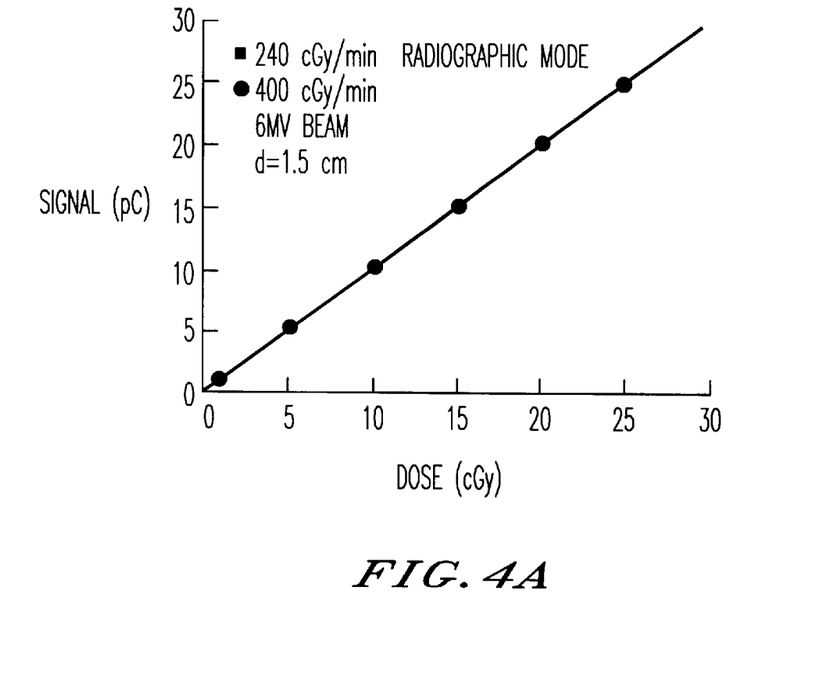
FIGS. 4(a) and 4(b) show test results corresponding to the configuration of FIG. 1(a)
Figure 4B:
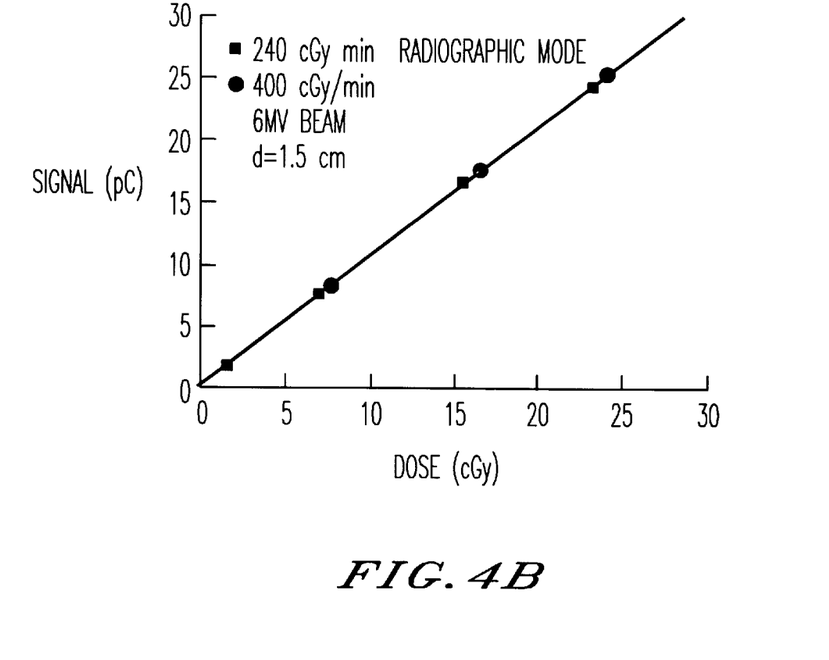
Figure 5:
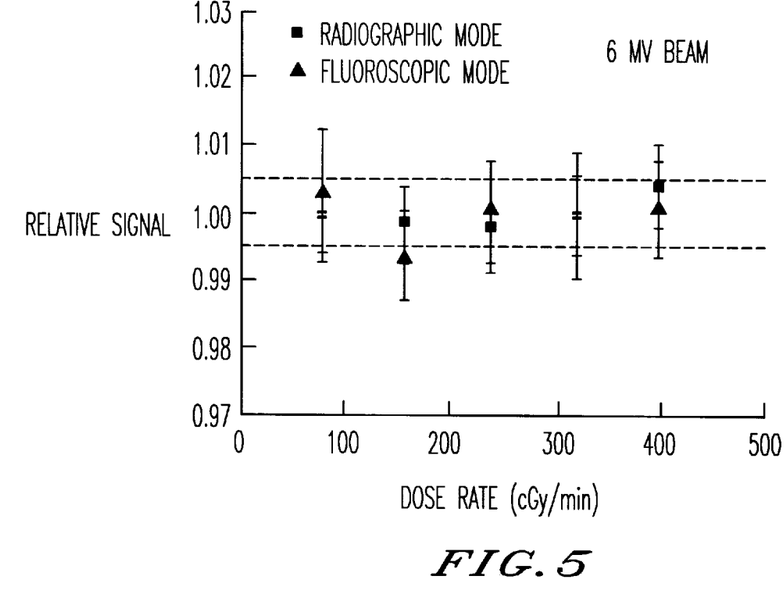
FIG. 5 shows further test results corresponding to the configuration of FIG. 1(a)
Figure 6A:
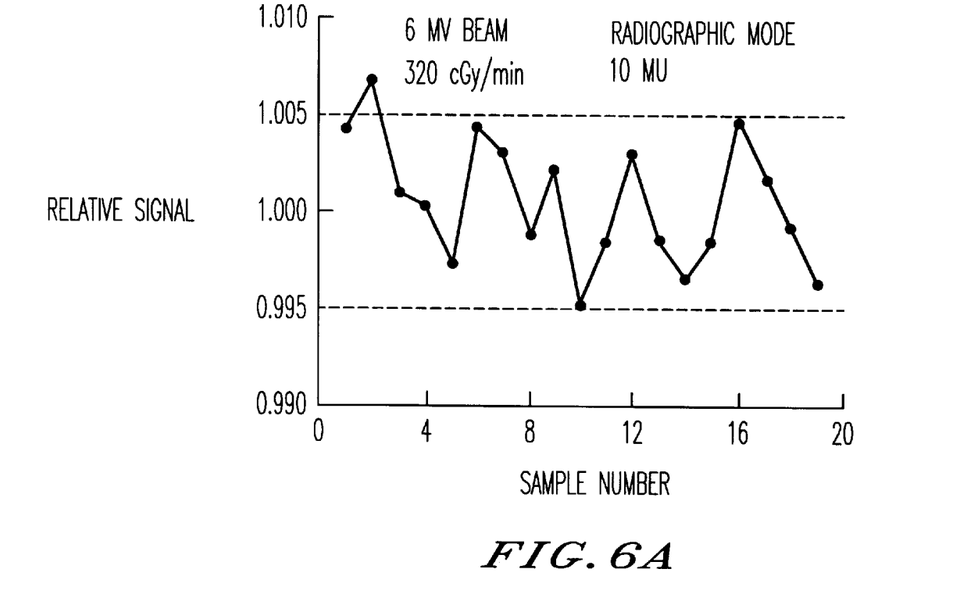
FIGS. 6(a) and 6(b) show further test results corresponding to the configuration of FIG. 1(a)
Figure 6B:
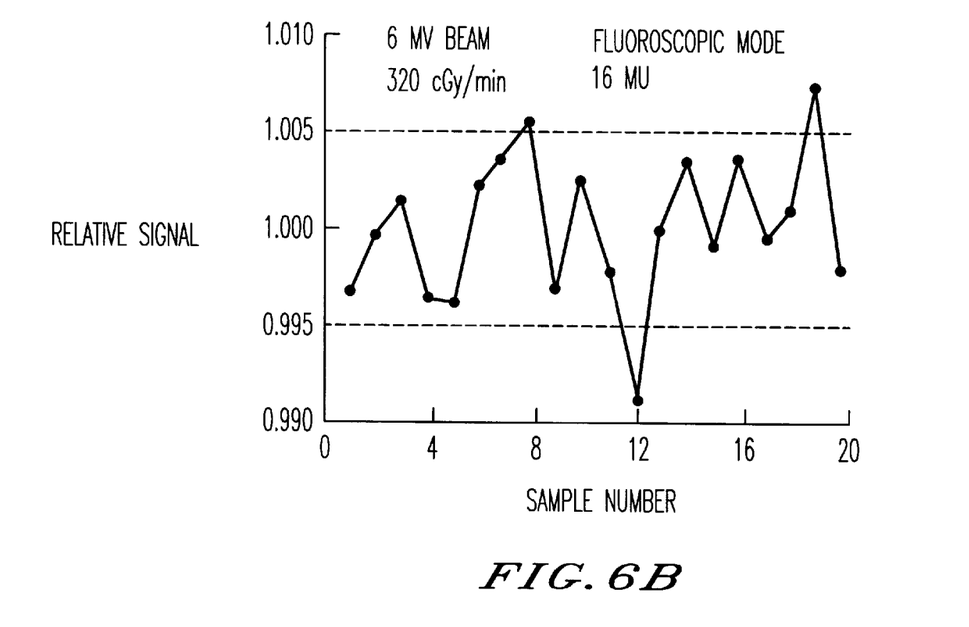
Figure 7A:
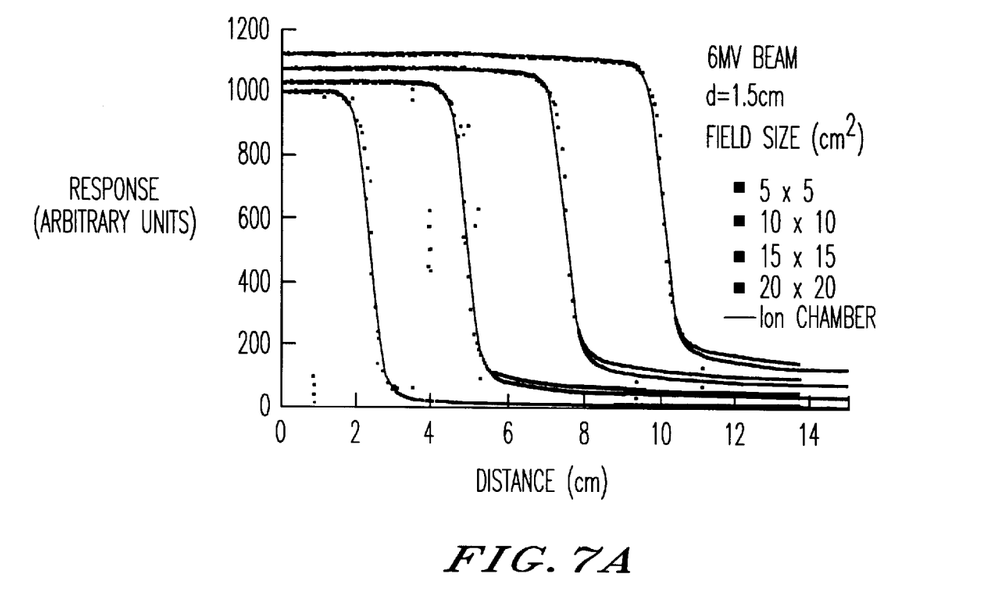
FIGS. 7(a) and 7(b) show further test results of comparisons between the configuration of FIG. 1(a) and an ion chamber dosimetry device.
Figure 7B:
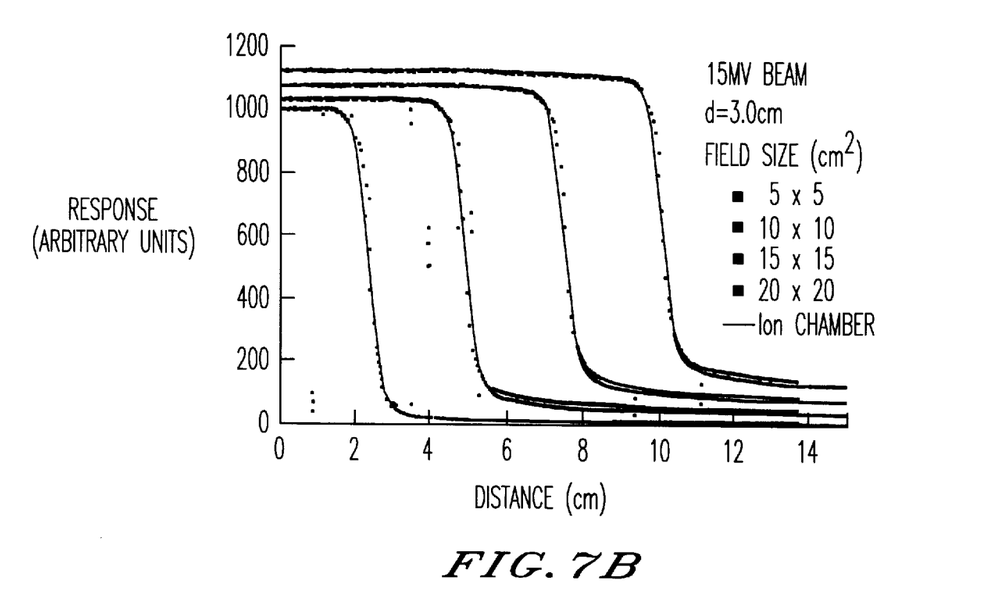
Figure 8A:
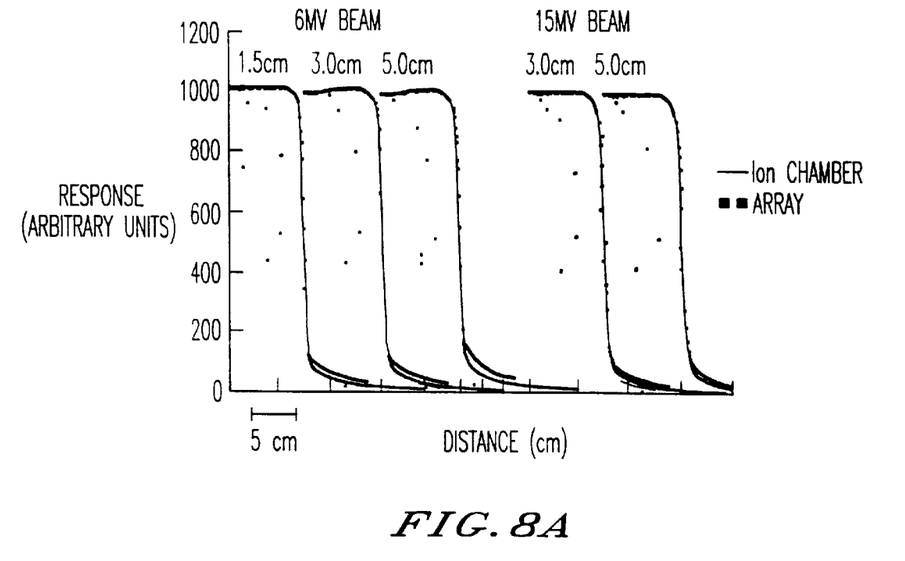
FIGS. 8(a) and 8(b) show further test results of comparisons between the configuration of FIG. 1(a) and an ion chamber dosimetry device.
Figure 8B:
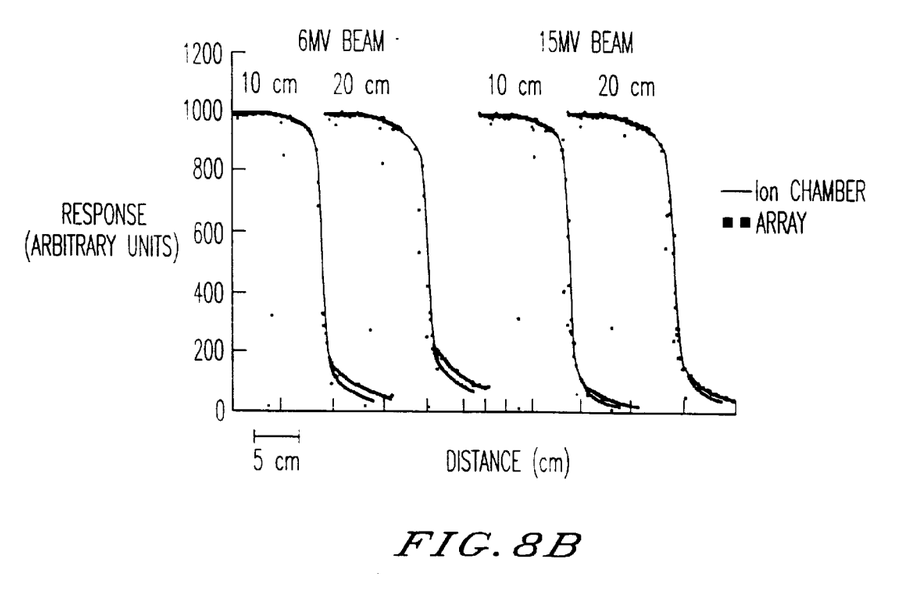
Figure 9:
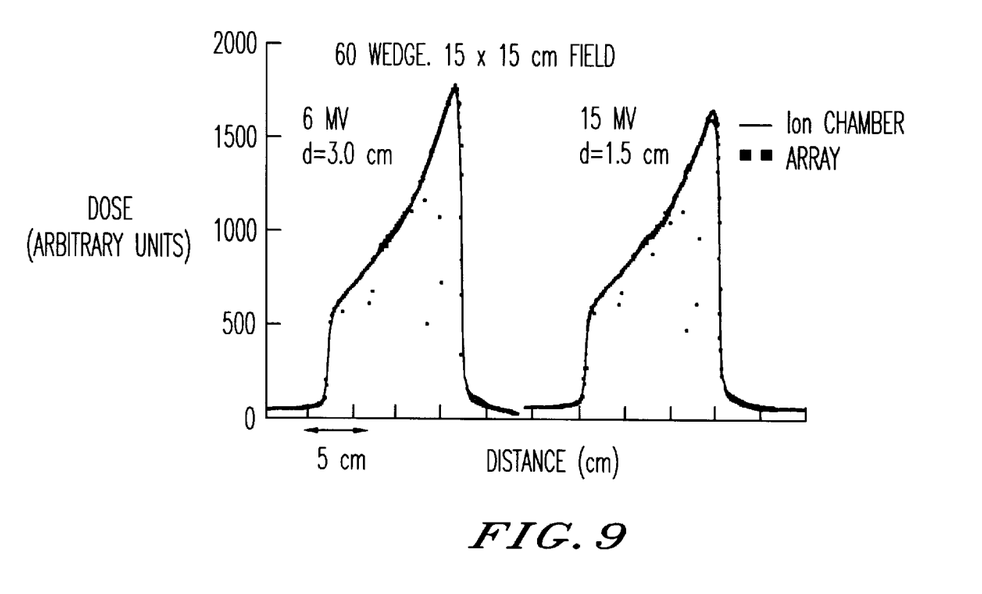
FIG. 9 shows further test results of comparisons between the configuration of FIG. 1(a) and an ion chamber dosimetry device.

More particularly, FIGS. 4(a) and 4(b) show measurements demonstrating good linearity of a pixel response with dose, at two dose rates, in radiographic and fluoroscopic modes respectively. FIG. 5 shows measurements demonstrating a very high degree of dose rate independence for radiographic and fluoroscopic modes respectively. FIGS. 6(a) and 6(b) show measurements demonstrating a very high degree of reproducibility of measurements in radiographic and fluoroscopic modes respectively. FIGS. 7(a) and 7(b) show measurements demonstrating a very good reproduction of ion chamber beam profile data as a function of field size for 5×5 to 20×20 cm fields for 6 MV and 15 MV, respectively. FIGS. 8(a) and 8(b) show measurements demonstrating a very good reproduction of the ion chamber beam profiles as a function of depth of the overlying solid water (1.5 to 20 cm) for 6 MV and 15 MV. FIG. 9 shows measurements demonstrating a very good reproduction of the ion chamber being profiled with a 60° wedge placed in the field for 6 MV and 15 MV. In all cases, the degree of agreement between the ion chamber data and the array data for configuration of FIG. 1(a) was much better than that for the configurations of FIGS. 1(b) and 1(c).

Such a configuration as shown in FIG. 1(a) provides a better agreement with ion chamber data than the configurations of FIGS. 1(b) and 1(c) for a number of reasons. In the case of the configuration of FIG. 1(a), in which no phosphor layer 44 or copper layer 46 is provided, the sensor 50 senses radiation by the creation of charge as a result of high energy electrons passing through the sensor 50. These high energy electrons are created by x-ray photons interacting in the solid water stacks 64 above and below the sensor 50, in the substrate 12 and in the mechanical backing 60. In the case of the configurations of FIGS. 1(b) and 1(c), a primary mechanism by which the sensor 50 senses radiation is by "indirection detection". That is, such an "indirect detection" involves the sensor 50 sensing light which is created in the overlying phosphor layer 44 and copper layer 46 by high energy electrons. In the configurations of FIGS. 1(b) and 1(c), some of the signals also originate from the passage of high energy electrons through the sensor 50 as in the configuration of FIG. 1(a), but this only provides a small effect compared to the generated light signal by the phosphor 44 and copper layer 46.

In each of these configurations of FIGS. 1(a)–1(c), very few of the x-rays interact in the sensor 50 since the sensor 50 is so thin, on the order of 1 $\mu$m. In both the case of the configuration of FIG. 1(a) and an ion chamber measurement, the measured signal is primarily a result of ionization in a volume of the detector, (i.e., the sensor 50 or the air in the ionization chamber), by high energy electrons in a surrounding medium (i.e., largely solid water in the case of the embodiment of FIG. 1(a) and regular water in the case of the ion chamber). For these reasons, these two different means of measurement show similar responses as shown in FIGS. 4a–9.

In contrast, the different responses of the configuration in FIGS. 1(b) and 1(c) compared to the ion chamber results can be expected given that a significant number of x-rays interact in the phosphor layer 44 and copper layer 46, whose compositions are quite different from that of water. These layers 44, 46 have the greatest influence on the dosimetry operations in these devices. These factors cause the response of the function of energy for the configurations of FIGS. 1(b) and 1(c) to be significantly different from that of the configuration of 1(a) and the ion chamber, and thus a poor agreement of the configurations of FIGS. 1(b) and 1(c) data with the ion chamber data is expected.

Figure 1D:
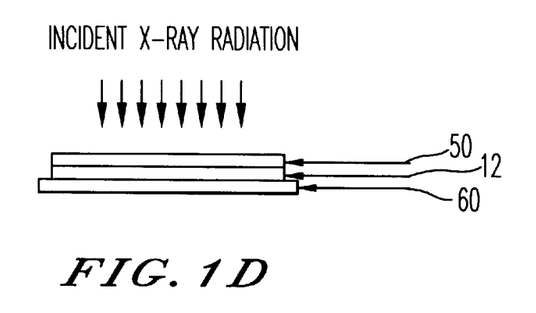
FIGS. 1(d)–1(h) show further dosimetry devices of the present invention.

As noted above, the device of a preferred embodiment of the present invention as shown in FIG. 1(a) incorporates upper and lower human tissue substitute layers 64 to provide close approximation to human tissue. However, the present invention in an alternative form may delete the use of such human tissue substitute layers 64 and provide the generation of high energy electrons from the substrate 12 and the mechanical backing 60, as shown in FIG. 1(d). This configuration of FIG. 1(d) could for example be placed in a bath of water 65 as shown in FIG. 1(h) to obtain data at various depths of water. Of course the sensor 50 and its associated acquisition electronics can, if necessary, be shielded from the effects of the surrounding water.

Figure 1E:
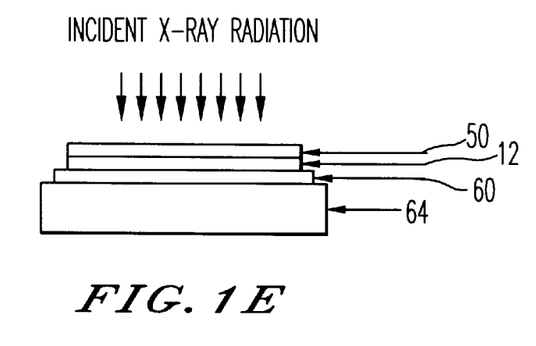
Figure 1F:
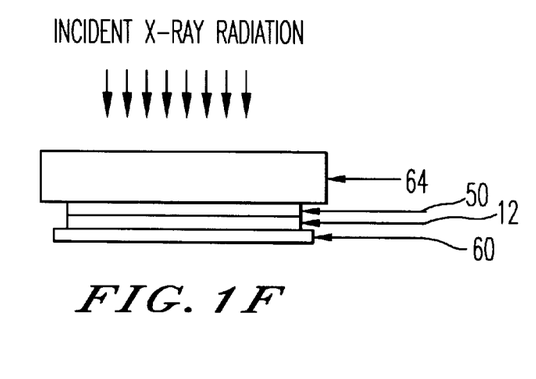

Moreover, only an upper or a lower human tissue substitute layer 64 can be utilized, and thus a further embodiment of the present invention may employ only a lower human tissue substitute layer 64 as shown in FIG. 1(e) or only an upper human tissue substitute layer 64 as shown in FIG. 1(f). The embodiment shown in FIG. 1(e) may provide a beneficial application in measuring an entrance dose, as the human tissue substitute layer 64 is only provided below the sensor 50, and the embodiment FIG. 1(f) may provide a beneficial operation in determining an exit dose, as the human tissue substitute layer 64 is provided only above the sensor 50.

Figure 1G:
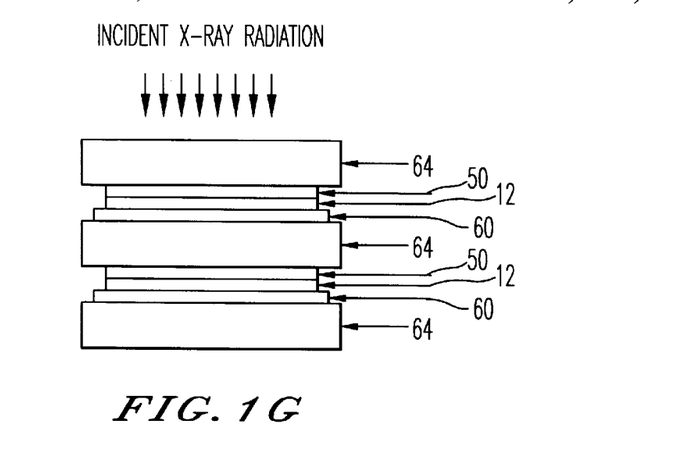
Figure 1H:
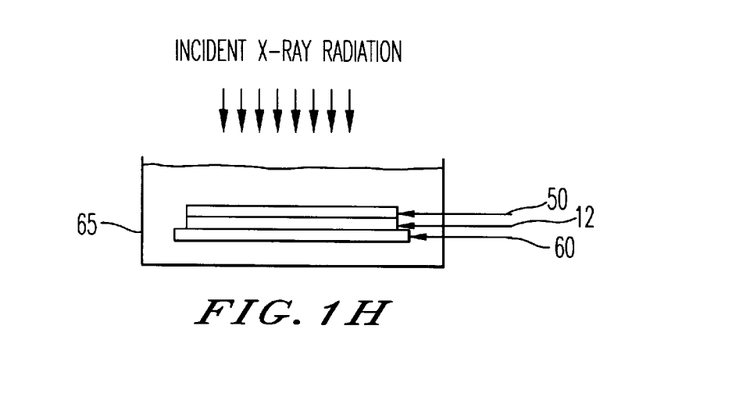

Another possible structure of the present invention is shown in FIG. 1(g) which essentially shows the structure of FIG. 1(a) with a further stacking of a sensor 50, substrate 12, mechanical backing 60 and human tissue substitute layer 64. Such a structure as shown in FIG. 1(g) allows acquiring multiple plans of dosimetry data simultaneously without having to reposition the sensor 50, substrate 12 and mechanical backing 60. This stacking combination could also be applied to the embodiment immersed in water as shown in FIG. 1(h). Of course as many stackings as necessary could be employed.

Further, each of the structures as shown in FIGS. 1(a), 1(e), 1(f) and 1(g) only show utilizing the human tissue substitute layers 64 on the top and/or the bottom of the sensor 50. However, such human tissue substitute layers 64 could also be placed on the sides of the sensors to essentially completely surround and encompass the sensor 50, substrate 12 and mechanical backing 60.

It should also be restated that each of the applications discussed above are provided in the context of medical dosimetry applications. The present invention is clearly applicable to other types of dosimetry applications. In non-medical dosimetry applications, the human tissue substitute layers 64 can be replaced with another material whose radiological properties are equivalent to those of the object in which the dose is to be determined.

As discussed above, the present invention utilizes a sensor 50 which does not require the use of any layers converting incident x-ray radiation to light photons. One form the sensors may take is as disclosed in U.S. Pat. Nos. 5,079,426 and 5,262,649, which as noted above have been incorporated herein by reference. If such sensors as disclosed in these devices were embodied in the present invention, the present invention would delete the phosphor layer 44 and copper layer 46 in the sensor devices of these patents, and in a preferred embodiment would replace the phosphor layer 44 and copper layer 46 with the upper human tissue substitute layer 64 of the present invention.

However, the present invention is not restricted to the types of sensors disclosed in these U.S. Pat. Nos. 5,079,426 and 5,262,649. Other possible sensors may include any material which generates electrons (and/or holes) when high energy electrons pass through it and from which the electrons (and/or holes) can be extracted, typically by an externally applied electric field. Such sensors may include semiconductor detector materials and photoconductor detector materials such as described in "Semiconductors For Room-Temperature Radiation Detector Applications, MRS Proceedings, Vol. 32, 1993" and in "Radiation Detection And Measurement, Second Edition, Glenn F. Knoll, 1989", and may include a —Si:H, Ge, $HgI_2$, $PbI_2$, diamond, GaAs, $HgBr_xI_{2-x}$, $Cd_xTe$, ZnTe and chalogenide glass such as amorphous selenium.

One consideration for the selection of sensor 50 is that the thickness of the sensor should not be so great as to allow more than 1% of the electrons (and/or holes) sensed in the sensor to originate from high energy electrons generated by the interaction (for example via photoelectric, Compton or pair production) of the incident radiation, e.g., x-rays, in the sensor itself. Stated another way, the sensor itself, i.e. the sensing element 50 which stores a signal based on the high energy electrons (which are generated in the substrate 12, mechanical backing 60, and human tissue substitute layers 64), should be thin enough so that the majority (for example on the order of 99% or more) of the electrons (and/or holes) sensed by the sensor originate from the passage of high energy electrons which are generated by the interaction of incident radiation, e.g., x-rays, outside the sensor (in the substrate 12, mechanical backing 60, and human tissue substitute layers 64). An alternative criteria is that the thickness of the sensor is such that only 1% or less of the interacting incident radiation, e.g., x-rays, directly sensed by the sensor (via resulting high energy electrons) actually interact (via photoelectric, Compton or pair production) in the sensor itself Stated another way, the sensor should be sufficiently thin so that the majority (on the order of 99% or more) of the interacting incident radiation, e.g., x-rays, sensed by the sensor (via resulting high energy electrons) originate from radiation interactions in material outside the thin sensor 50 itself.

Satisfying either of these criteria will help to ensure that the desired energy response of the device is maintained. These criteria also ensure that the presence of the sensor has a minimal effect upon the influence of high energy electrons in the sensor, which is a significant condition for the measurement of dose. A sensor that fits either of these criteria would generally be sub-optimal for imaging via direct detection of the incident radiation, e.g., x-rays, by the sensors due to the relatively poor efficiency such a sensor would exhibit for directly detecting incident radiation.

In this way, these desirable criteria recognized according to the present invention for the dosimetry applications distinguish from conventional devices in which sensors are thick to maximize the influence of direct x-ray radiation detection.

Further according to the present invention, the sensors 50 can be configured in an array and can be shielded from stray light and electromagnetic radiation, as also disclosed in U.S. Pat. Nos. 5,079,462 and 5,262,649.

Such a device of the present invention can find application as both a relative dosimeter and an absolute dosimeter, particularly given the high linearity with dose as shown in FIGS. 4(a) and 4(b), and the reproducibility, as shown in FIGS. 6(a) and 6(b). Morever, the use of such a dosimeter as in the present invention allows a self-scanning read-out, and permits the acquisition of relative and absolute dosimetry data in real-time and in digital form. This provides a significant advantage over the above-discussed background dosimetry systems which are not in real time and which are not digital such as utilizing the x-ray film, and even compared to the ion chambers which must be laboriously scanned in order to take a plane of dosimetric data.

As noted above, the present dosimetry system can provide data in real-time, on the same basis as disclosed in U.S. Pat. Nos. 5,079,426 and 5,363,649 which as noted above are incorporated herein by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A radiation dosimeter comprising:

a human tissue substitute structure in which incident radiation is absorbed resulting in emission of high energy electrons within said human tissue substitute structure; and a sensor disposed in the path of said radiation and adjacent said human tissue substitute structure to sense the high energy electrons generated within said human tissue substitute structure thereby to generate in the sensor electrons and holes due primarily to the high energy electrons generated within said human tissue substitute structure; and means for extracting electrons and holes generated in said sensor as an indication of the energy absorbed per unit mass of the human tissue substitute structure.

2. The dosimeter of claim 1, wherein said human tissue substitute structure comprises:

a substrate on which said sensor is formed and a mechanical backing for said substrate.

3. The dosimeter of claim 2, wherein said human tissue substitute structure comprises:

a human tissue substitute material on which said sensor, substrate and mechanical backing are mounted.

4. The dosimeter of claim 2, wherein said human tissue substitute structure comprises a human tissue substitute material interposed between said sensor and a source of said incident radiation.

5. The dosimeter of claim 1, wherein said extracting means comprises:

means for generating an electric field across said sensor.

6. The dosimeter of claim 1, wherein said sensor comprises:

a material selected from the group consisting of a —Si:H, Ge, $HgI_2$, $PbI_2$, diamond, GaAs, $HgBr_xI_{2-x}$, $Cd_xTe$, ZnTe and chalogenide glass.

7. The dosimeter of claim 1, wherein said sensor has a thickness such that only 1% or less of radiation incident on said sensor directly interacts with said sensor to directly produce high energy electrons in said sensor.

8. The dosimeter of claim 1, wherein the sensor has a thickness of approximately 1 $\mu$m.

9. A radiation dosimeter comprising:

a human tissue substitute structure in which incident radiation is absorbed resulting in the emission of high energy electrons within said human tissue substitute structure; and a sensor disposed in a path of said incident radiation and to sense the high energy electrons generated within said human tissue substitute structure without conversion of the incident radiation to light energy; and means for reading a signal generated in said sensor as an indication of an energy absorbed per unit mass of the human tissue substitute structure.

10. The dosimeter of claim 9, wherein said human tissue substitute structure comprises:

a substrate on which said sensor is formed and a mechanical backing for said substrate.

11. The dosimeter of claim 10, wherein said human tissue substitute structure comprises:

at least one human tissue substitute material on which said sensor, substrate and mechanical backing are mounted.

12. The dosimeter of claim 10, wherein said human tissue substitute structure comprises a human tissue substitute material interposed between said sensor and a source of said incident radiation.

13. The dosimeter of claim 9, wherein said reading means comprises:

means for generating an electric field across said sensor.

14. The dosimeter of claim 9, wherein said sensor comprises:

a material selected from the group consisting of a —Si:H, Ge, $HgI_2$, $PbI_2$, diamond, GaAs, $HgBr_xI_{2-x}$, $Cd_xTe$, ZnTe and chalogenide glass.

15. The dosimeter of claim 9, wherein said sensor has a thickness such that only 1% or less of radiation incident on said sensor directly interacts with said sensor.

16. The dosimeter of claim 9, wherein the sensor has a thickness of approximately 1 $\mu$m.

17. A dosimetry method for radiation comprising the steps of:

providing a human tissue substitute structure adjacent a sensor layer;

absorbing incident radiation to result in emission of high energy electrons within said human tissue substitute structure;

sensing the high energy electrons generated within said sensor layer to generate electrons and holes due primarily to the sensed high energy electrons; and extracting the electrons and holes from said sensor layer as an indication of the energy absorbed per unit mass of the human tissue substitute structure.

18. The dosimetry method of claim 17, wherein said converting step converts the incident radiation to high energy electrons in a substrate and a mechanical backing.

19. The dosimetry method of claim 17, wherein said converting step converts the incident radiation to high energy electrons in a human tissue substitute material, a substrate and a mechanical backing.

20. The dosimetry method of claim 17, wherein said converting step converts the incident radiation to high energy electrons in a human tissue substitute material element.

21. The dosimetry method of claim 17, wherein said extracting step comprises the substep of generating an electric field.

22. The dosimetry method of claim 17, wherein said receiving step generates the electrons and holes in a material selected from the group consisting of a —Si:H, Ge, $HgI_2$, $PbI_2$, diamond, GaAs, $HgBr_xI_{2-x}$, $Cd_xTe$, ZnTe and chalogenide glass.

23. The dosimetry method of claim 17, wherein said radiation is incident on said sensor layer and in said receiving step only 1% or less of the incident radiation directly produces high energy electrons in said sensor layer.

24. The dosimetry method of claim 17, wherein the sensor has a thickness of approximately 1 $\mu$m.

25. A dosimetry method for radiation comprising the steps of:
providing a human tissue substitute structure adjacent a sensor layer;
absorbing incident radiation to result in emission of high energy electrons within said human tissue substitute structure;
sensing the high energy electrons generated within said sensor layer without conversion of the incident radiation to light energy; and
reading a signal of the received high energy electrons from said sensor layer as an indication of an energy absorbed per unit mass of the human tissue substitute structure.

26. The dosimeter method of claim 25, wherein said converting step converts the incident radiation to high energy electrons in a substrate and a mechanical backing.

27. The dosimetry method of claim 25, wherein said converting step converts the incident radiation to high energy electrons in at least one human tissue substitute material, a substrate and a mechanical backing.

28. The dosimetry method of claim 25, wherein said converting step converts the incident radiation to high energy electrons in a human tissue substitute material.

29. The dosimetry method of claim 25, wherein said reading step comprises the substep of generating an electric field.

30. The dosimetry method of claim 25, wherein said receiving step receives the high energy electrons in a material selected from the group consisting of a —Si:H, Ge, $HgI_2$, $PbI_2$, diamond, GaAs, $HgBr_xI_{2-x}$, $Cd_xTe$, ZnTe and chalogenide glass.

31. The dosimetry method of claim 25, wherein radiation is incident on said sensor layer and in said receiving step only 1% or less of the incident radiation directly interacts with said sensor layer.

32. The dosimetry method of claim 25, wherein the sensor has a thickness of approximately 1 $\mu$m.

33. A radiation dosimeter comprising:
a medium in which dose is to be determined, and in which incident radiation is absorbed to result in emission of high energy electrons within said medium;
a sensor disposed in the path of said radiation and adjacent said medium to sense the high energy electrons generated within said medium thereby to generate in the sensor electrons and holes due primarily to the high energy electrons generated within said medium; and
means for extracting electrons and holes generated in said sensor as an indication of the energy absorbed per unit mass of the medium.

34. The dosimeter of claim 33, wherein the sensor has a thickness of approximately 1 $\mu$m.

35. The dosimeter of claim 33, wherein said extracting means comprises:
means for generating an electric field across said sensor.

36. The dosimeter of claim 33, wherein said sensor comprises:
a material selected from the group consisting of a —Si:H, Ge, $HgI_2$, $PbI_2$, diamond, GaAs, $HgBr_xI_{2-x}$, $Cd_xTe$, ZnTe and chalogenide glass.

37. The dosimeter of claim 33, wherein said sensor has a thickness such that only 1% or less of radiation incident on said sensor directly interacts with said sensor to directly produce high energy electrons in said sensor.

38. A dosimetry method for radiation comprising the steps of:
providing a medium in which dose is to be determined adjacent a sensor;
absorbing incident radiation to result in emission of high energy electrons within said medium;
sensing the high energy electrons in said sensor which generate electrons and holes due primarily to the sensed high energy electrons; and
extracting the electrons and holes from said sensor layer as an indication of the energy absorbed per unit mass of the medium.

39. The dosimetry method of claim 38, wherein the sensor has a thickness of approximately 1 $\mu$m.

40. The dosimetry method of claim 38, wherein said extracting step comprises the substep of generating an electric field.

41. The dosimetry method of claim 38, wherein said receiving step generates the electrons and holes in a material selected from the group consisting of a —Si:H, Ge, $HgI_2$, $PbI_2$, diamond, GaAs, $HgBr_xI_{2-x}$, $Cd_xTe$, ZnTe and chalogenide glass.

42. The dosimetry method of claim 38, wherein said radiation is incident on said sensor layer and in said receiving step only 1% or less of the incident radiation directly produces high energy electrons in said sensor layer.

* * * * *

UNITED STATES PATENT AND TRADEMARK OFFICE
CERTIFICATE OF CORRECTION

PATENT NO. : 6,013,916

DATED : JANUARY 11, 2000

INVENTOR(S): LARRY E. ANTONUK

It is certified that an error appears in the above-identified patent and that said Letters Patent is hereby corrected as shown below:

Column 5, line 30, change "30. cm" to --3.0 cm--.

Column 6, line 45, change "indirection" to --indirect--.

Column 8, line 19, change "a—Si:H" to --a-Si:H--;

line 38, change "criteria" to --criterion--;

line 43, change "itself" to --itself.--.

Column 9, line 58, change "a—Si:H" to --a-Si:H--.

Column 10, line 30, change "a—Si:H" to --a-Si:H--.

Column 11, line 1, change "a—Si:H" to --a-Si:H--;

line 40, change "a—Si:H" to --a-Si:H--.

Signed and Sealed this

Third Day of April, 2001

*Attest:*

NICHOLAS P. GODICI

*Attesting Officer*     Acting Director of the United States Patent and Trademark Office